(No Model.)
C. W. W. BALL & J. L. GORDON.
FILTER.
No. 522,819. Patented July 10, 1894.
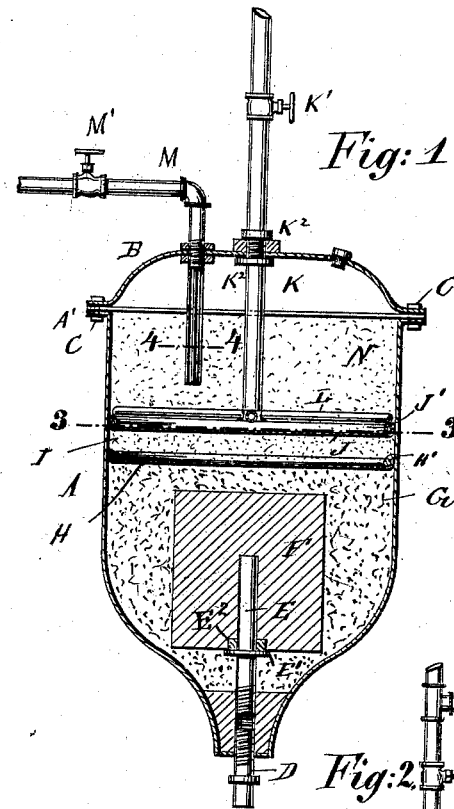
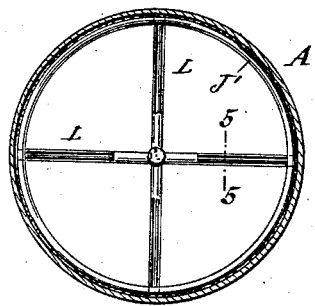
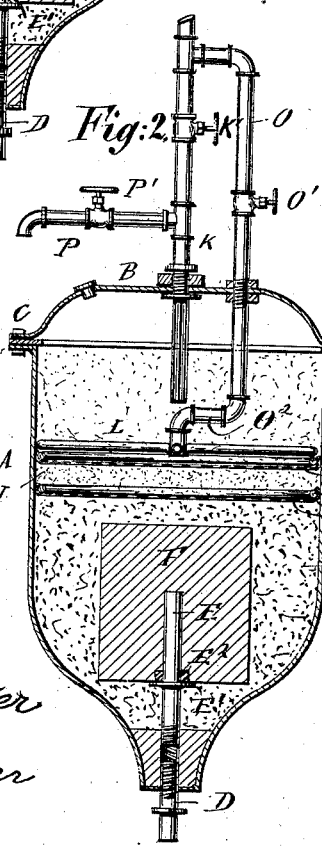
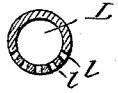
WITNESSES:
Charles Schroeder
Adolph Scherer
INVENTORS
Charles W. W. Ball
James L. Gordon
BY
Guepel Rueyener
ATTORNEYS.

UNITED STATES PATENT OFFICE.

CHARLES W. W. BALL, OF NEW YORK, AND JAMES L. GORDON, OF BROOKLYN, NEW YORK.

FILTER.

SPECIFICATION forming part of Letters Patent No. 522,819, dated July 10, 1894.

Application filed August 22, 1893. Serial No. 483,782. (No model.)

*To all whom it may concern:*

Be it known that we, CHARLES W. W. BALL, of the city of New York, in the county of New York, and JAMES L. GORDON, of Brooklyn, in the county of Kings, State of New York, citizens of the United States, have invented certain new and useful Improvements in Filters, of which the following is a specification.

This invention relates to improvements in the well known "Buehring" filter; and the objects of our invention are to simplify the construction of the filter, to make the same more effective and to facilitate washing out the coarse impurities that have been retained by the filter.

The invention consists in the combination, with a vessel, of a tube projecting upward from the bottom of the same, a flange on said tube, a block of carbon held on the tube, said block of carbon having a bottom aperture through which the tube can pass.

The invention further consists in the combination, with a vessel, of a filtering medium in the same, a fabric diaphragm on the top of the filtering medium, which diaphragm has its edges turned up, a spring ring resting on the diaphragm and pressing the edges of the same against the side of the vessel.

The invention further consists in the combination, with the said diaphragm and ring, of a tube projecting downward from the cover of the vessel and provided at its lower end with slitted branch tubes, the ends of which branch tubes rest on the rings of the diaphragm.

The invention also consists in the construction and combination of parts and details which will be fully described hereinafter and finally pointed out in the claim.

In the accompanying drawings, Figure 1 is a vertical longitudinal sectional view of one construction of our improved filter. Fig. 2 is a similar view of a modified construction, and Fig. 3 is a sectional plan view on the line 3 3, of Fig. 1, from the under side, and Figs. 4 and 5 are enlarged sectional views on the lines 4, 4, and 5, 5, Figs. 1 and 3 respectively.

Similar letters of reference indicate corresponding parts.

The filter is constructed with a metal or porcelain vessel A tapered at its lower end, and provided at the upper end with a flange A' for receiving the bent down flange of the cover B, which cover is retained on the vessel A by means of screw-bolts C passed through the cover and through the flange of the vessel A. A coupling tube D is screwed into a threaded opening in the bottom or lower end of the vessel A and a tube E open at its upper end is also screwed into the threaded opening in the bottom of the vessel A in such a manner that said tube projects upward into said vessel A. The tube E is provided near its lower end with a flange E', on which a cork ring E² rests. A block of carbon F is provided in its bottom with a vertical aperture for receiving the tube E, and said block is pressed down on the tube E until the block rests on the flange E', the cork ring E² being forced into the lower enlarged end of the aperture in the carbon block. Thereby said carbon block is held firmly and securely on the tube E and the water filtering through said block can pass into the upper end of said tube E and out through said tube.

The space between the side walls of the vessel A and the carbon block F is filled with carbon pieces H, which are carefully packed, and also cover the top of the block. On the carbon G a diaphragm H of asbestus fabric is placed, and its edges bent up against the inner sides of the walls of the vessel A, which edges are retained by a spring ring H' placed upon said diaphragm and pressing the upturned edges of the same against the sides of the vessel. A layer I of finely powdered carbon is then placed on the diaphragm H and carefully packed and tamped, and on this layer I of carbon, a second diaphragm J, also made of asbestus fabric is placed and is likewise clamped by means of a spring ring J'.

The inlet tube K having a suitable cock K' is firmly secured in the cover B by means of double nuts K² on the cover, and to the lower end of said inlet tube K two tubes L at right-angles to each other are fastened, which tubes are provided throughout the greater distance of their length and on the under side with two or more radial slits *l*, as shown in Fig. 5. Said tubes L have such length that when the cover B is placed on the vessel, the ends of said tubes L rest on the upper spring ring J' and bear down on the same. By drawing up the nuts C that hold the cover on the vessel, the tubes K and the tubes L also are drawn downward and the said tubes L exert a still greater pressure on the upper spring ring J'.

The wash-out tube M passing through the cover is provided with a cock M' and has its end projecting downward from the cover slitted longitudinally, so that the same acts as a screen, as shown in detail in Fig. 4.

The space between the cover and the upper diaphragm J is filled with coarse carbon N, which carbon N is still coarser than the carbon G below the first diaphragm H.

In the construction shown in Fig. 2, the lower end of the inlet pipe K is slitted longitudinally to act as a screen, and the inlet pipe K is provided with a by-pass pipe O secured in the cover and having a cock O', which by-pass pipe has its lower end $O^2$ so bent as to be below the lower end of the inlet pipe K, and the pipes L in this case are secured to the lower end of the by-pass pipe O and bear on the upper spring ring J' in the same manner as in the construction shown in Fig. 1. The inlet pipe K has a branch-pipe P provided with a cock P'.

The operation is as follows:—In the construction shown in Fig. 1, the cock M is ordinarily closed, and the water to be filtered passes through the pipe K and is distributed through the slitted pipes L opening into the filtering medium through which it passes, the coarse impurities being retained by the upper layer N of coarse carbon, and the other impurities being retained by the remaining carbon. The water passes through the several layers of carbon and through the carbon block F and out through the pipe E. When it is desired to remove the coarse impurities retained in the filter, the cock M' is opened and the water then issuing from the slitted pipes L does not pass through the carbon layers I G in the block F, but passes up through the coarse carbon N and into the pipe M through the slotted end of the same and passes out carrying along the coarse impurities. The cock M is then closed and the filter can be used in the usual way for filtering.

In the construction shown in Fig. 2, the cocks P' and O' are ordinarily closed, and the water to be filtered flows through the pipe K and passes out through the pipe E in the manner previously described. When the coarse impurities are to be removed from the filter the cock K' in the pipe K is closed and the cocks O' and P' are opened. The water now passes through the by-pass pipe O and the slitted pipes L, but does not pass through the layers I G of carbon and the carbon block F, but passes up through the coarse carbon N and into the lower slitted end of the inlet-pipe K and through the branch P of the same, carrying along the coarse impurities.

Our improved filter is simple in construction, can easily be filled, the filtering medium is of different grades, is held firmly and securely, and the coarser particles or impurities can be removed with great facility.

Having thus described our invention, we claim as new and desire to secure by Letters Patent—

In a filter, the combination, with a vessel, of a filtering medium in the same, a diaphragm resting on said filtering medium and having its edges turned up, a ring resting on the diaphragm and against the upturned edges, a tube projecting downward from the cover of the vessel, branch tubes secured to the lower end of said tube and having their ends rested on said ring, which branch tubes are slitted, substantially as set forth.

In testimony that we claim the foregoing as our invention we have signed our names in presence of two subscribing witnesses.

CHARLES W. W. BALL.
JAMES L. GORDON.

Witnesses:
OSCAR F. GUNZ,
CHARLES SCHROEDER.